United States Patent
Poklemba et al.

(10) Patent No.: US 7,200,193 B2
(45) Date of Patent: Apr. 3, 2007

(54) QUADRATURE VESTIGIAL SIDEBAND DIGITAL COMMUNICATIONS METHOD AND SYSTEM WITH CORRELATED NOISE REMOVAL

(75) Inventors: John J. Poklemba, Ijamsville, MD (US); Gregory S. Mitchell, Bethesda, MD (US); Ronald F. Smith, Ashburn, VA (US)

(73) Assignee: The Aerospace Corporation, El Segundo, CA (US)

( * ) Notice: Subject to any disclaimer, the term of this patent is extended or adjusted under 35 U.S.C. 154(b) by 824 days.

(21) Appl. No.: 10/279,569

(22) Filed: Oct. 23, 2002

(65) Prior Publication Data
US 2003/0142765 A1    Jul. 31, 2003

Related U.S. Application Data

(63) Continuation-in-part of application No. 10/060,728, filed on Jan. 30, 2002, now Pat. No. 6,606,010.

(51) Int. Cl.
*H03D 1/00*    (2006.01)

(52) U.S. Cl. ..................................... 375/343

(58) Field of Classification Search ........... 340/538.12, 340/538.11, 310.13, 310.11, 538, 533, 532, 340/531, 500; 370/488, 485, 480, 464; 375/343, 375/350, 346, 316, 340; 379/406.08, 406.06, 379/406.01; 455/307, 296, 130; 702/127, 702/189, 190, 197, 196, 191
See application file for complete search history.

(56) References Cited

U.S. PATENT DOCUMENTS

| 4,019,140 | A   |   | 4/1977  | Swerdlow |         |
|-----------|-----|---|---------|----------|---------|
| 4,686,705 | A   |   | 8/1987  | Smith    |         |
| 5,995,567 | A   | * | 11/1999 | Cioffi et al. | 375/346 |
| 6,449,002 | B1  | * | 9/2002  | Markman et al. | 348/21 |
| 6,606,010 | B1  | * | 8/2003  | Poklemba et al. | 332/103 |

* cited by examiner

*Primary Examiner*—Pankaj Kumar
(74) *Attorney, Agent, or Firm*—Henricks, Slavin & Holmes LLP

(57) ABSTRACT

A quadrature vestigial-sideband (QVSB) method and system with correlated noise removal are embodied in a QVSB receiver with a correlated-noise estimator-subtractor configured to obtain I/Q channel correlated noise estimates for receive-filtered I/Q signals in the QVSB receiver, and to subtract the I/Q channel correlated noise estimates from the receive-filtered I/Q signals to whiten noises entering a quadrature-crosstalk, maximum-likelihood-sequence-estimator (QC-MLSE) of the QVSB receiver.

13 Claims, 6 Drawing Sheets

QUADRATURE VESTIGIAL SIDEBAND DIGITAL COMMUNICATIONS METHOD AND SYSTEM WITH CORRELATED NOISE REMOVAL

REFERENCE TO RELATED APPLICATIONS

This application is a continuation-in-part of U.S. patent application Ser. No. 10/060,728 entitled "Quadrature Vestigial Sideband Digital Communications Method" filed on Jan. 30, 2002, now U.S. Pat. No. 6,606,010, which is incorporated herein by reference in its entirety.

BACKGROUND OF THE INVENTION

Some known schemes for improving bandwidth (BW) efficiency employ partial-response (PR) or correlative-coding, vestigial-sideband or quadrature vestigial-sideband (VSB/QVSB) transmission, and Quadrature-Quadrature Phase-Shift Keying ($Q^2$PSK). In QVSB digital transmission, each of the in-phase and quadrature (i/q) baseline modulating channels contains the superposition of an independent pair of data streams.

QVSB embodies a very general approach to transmitting digital data in a bandwidth-efficient manner, and as a result, it is applicable to a wide variety of uses such as the Internet, Cellular, Personal Communications Service (PCS), Direct Broadcast Satellite (DBS), Cable Television (CATV), High-Definition Television (HDTV), etc. See, e.g., B. Henderson & J. Webb, "Quadrature Vestigial Sideband (QVSB) Data Transmission," *IEEE Transactions on Communications*, Vol. COM-33, No. 12, pp. 1274–1280, December 1985, incorporated by reference. With respect to HDTV, which uses a VSB format, the QVSB technique enables transmission of two independent data streams on quadrature carriers, simultaneously—thereby doubling the transmission capacity relative to VSB. See, e.g., W. Sabin & E. Schoenike, *Single-Sideband Systems and Circuits*, New York, McGraw-Hill, 1995, incorporated by reference.

Although QVSB provides the advantage over VSB of doubling the information carrying capacity, the disadvantages are greater implementation complexity, and typically reduced detection noise-margins, due to crosstalk between the quadrature channels. In unraveling this crosstalk, the quadrature-crosstalk maximum likelihood-sequence-estimator (QC-MLSE) described in U.S. patent application Ser. No. 10/060,728 is sub-optimum because it operates on correlated noise inputs, while its algorithms are predicated on uncorrelated noise inputs. In particular, the Bit-Error-Ratio is typically degraded by 1.5 dB due to the effects of correlated noise. It would be desirable to be able to address the effect of correlated noise and thereby improve QVSB data detection.

BRIEF DESCRIPTION OF THE DRAWINGS

Detailed description of embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

According to the present invention, correlated-noise components in each of the quadrature channels are estimated and subtracted from their respective incoming signals plus noise, which degenerates the remainder of the signal processing to a quadrature-coupled, partial-response, detection problem in white noise. Differences in QVSB with correlated-noise estimation implementations lie in how initial estimates of the transmitted data are generated. It is a waveshaping process on the received data sequence similar to what was done in the modulator to bandlimit the transmitted spectrum. By way of example, and as discussed below in greater detail, the waveshaping can be realized with data filters or a lookup table. According to an exemplary embodiment of the present invention, an iterated receiver structure is employed to initially generate sub-optimum message sequence estimates in breaking down the receive-filtered signals to generate estimates of its correlated-noise components. Interference on the receive-filtered signals is reduced to white noise for the final stage of maximum-likelihood-sequence-estimation.

Figure 1:
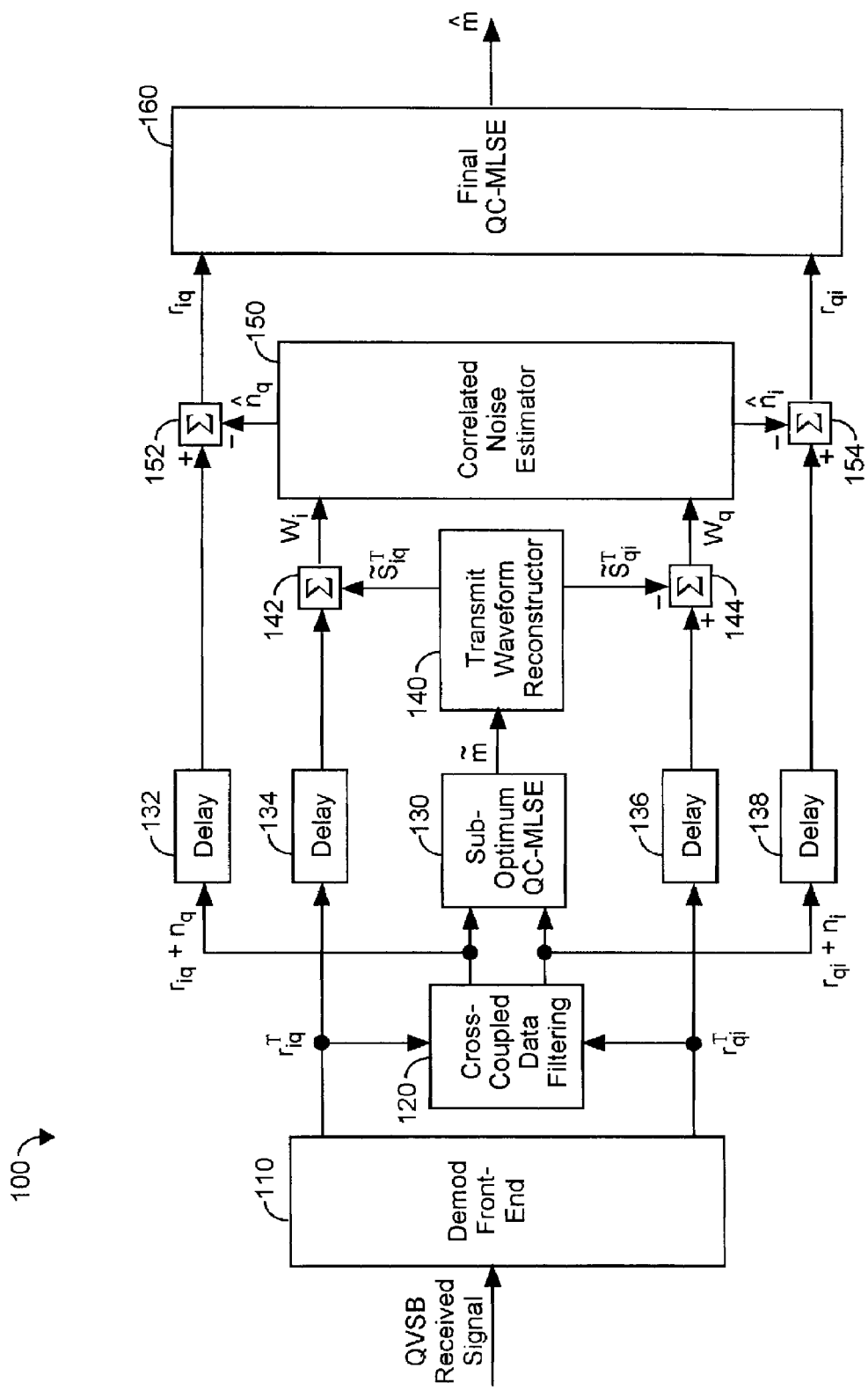
FIG. 1 is a block diagram of an exemplary QVSB receiver with a correlated-noise estimator-subtractor.

Referring to FIG. 1, an exemplary QVSB correlated-noise estimator-subtractor receiver 100 includes a demodulator front end 110, cross-coupled data filtering 120, a sub-optimum QC-MLSE 130, delays 132, 134, 136 and 138, a transmit waveform reconstructor 140, a correlated noise estimator 150, summers 142, 144, 152 and 154, and a final QC-MLSE 160 configured as shown. The correlated-noise whitener operates as follows. A QVSB signal is input to the demodulator front-end 110, which translates the incoming signal to inphase and quadrature (I/Q) baseband components, $r^T_{iq}$ and $r^T_{qi}$. These components pass through the cross-coupled data filters 120 (e.g., a set of cross-coupled, matched data filters), and their transmitted message component is subsequently estimated by the sub-optimum QC-MLSE 130 (e.g., a QC-MLSE adapted from a Viterbi algorithm). For example, the straight-through path and cross-coupled path filters constitute a near Hilbert-Transform pair, where a pure Hilbert-Transform would yield a single-sideband IF spectrum. This filter pair has been modified to give vestigial sideband. They can be the same filters as in U.S. patent application Ser. No. 10/060,728. However, their impulse-responses can also be augmented to force the quadrature response ISI values to be normalized to exactly ±0.5 at ±1 symbol times from the center, $h_q(-T_s)=-0.5$, and $h_q(+T_s)=0.5$, when $h_i(0)=1.0$. This will yield the best possible detection sample SNRs.

The operation of the QC-MLSE is described below and in U.S. patent application Ser. No. 10/060,728. The performance of this initial QC-MLSE 130 is sub-optimum because a correlation exists between its incoming I/Q noise components, and the QC-MLSE optimality is predicated on signals in uncorrelated additive white noise. Hence, a good, albeit sub-optimum, data estimate, m̂, is obtained. When this estimate is correct, it enables the originally transmitted I/Q signals, $\hat{s}^T_{iq}$ and $\hat{s}^T_{qi}$, to be exactly reconstructed. These reconstructed signal components are subtracted by the summers 142 and 144 from the demodulator front-end signals, $r^T_{iq}$ and $r^T_{qi}$, which yield uncorrelated white noise processes to drive the correlated-noise estimator 150. This noise estimator 150 is comprised of the same filters responsible for creating the correlated-noise component in the just-described, cross-coupled data-filtering module 120. Next, the correlated-noise estimates, $\hat{n}_i$ and $\hat{n}_q$, are subtracted by the summers 152 and 154 from the cross-coupled filtering outputs to yield receive-filtered I/Q signals in white noise, $r_{i_q}$ and $r_{q_i}$. Finally, the whitened I/Q inputs are processed by the final QC-MLSE 160 to provide optimal data estimates, $\hat{m}$.

The functional operations after the sub-optimum QC-MLSE including the final QC-MLSE—may be combined into a composite QC-MLSE with some saving in computational complexity, as some of the metrics have computations in common.

Figure 2A:
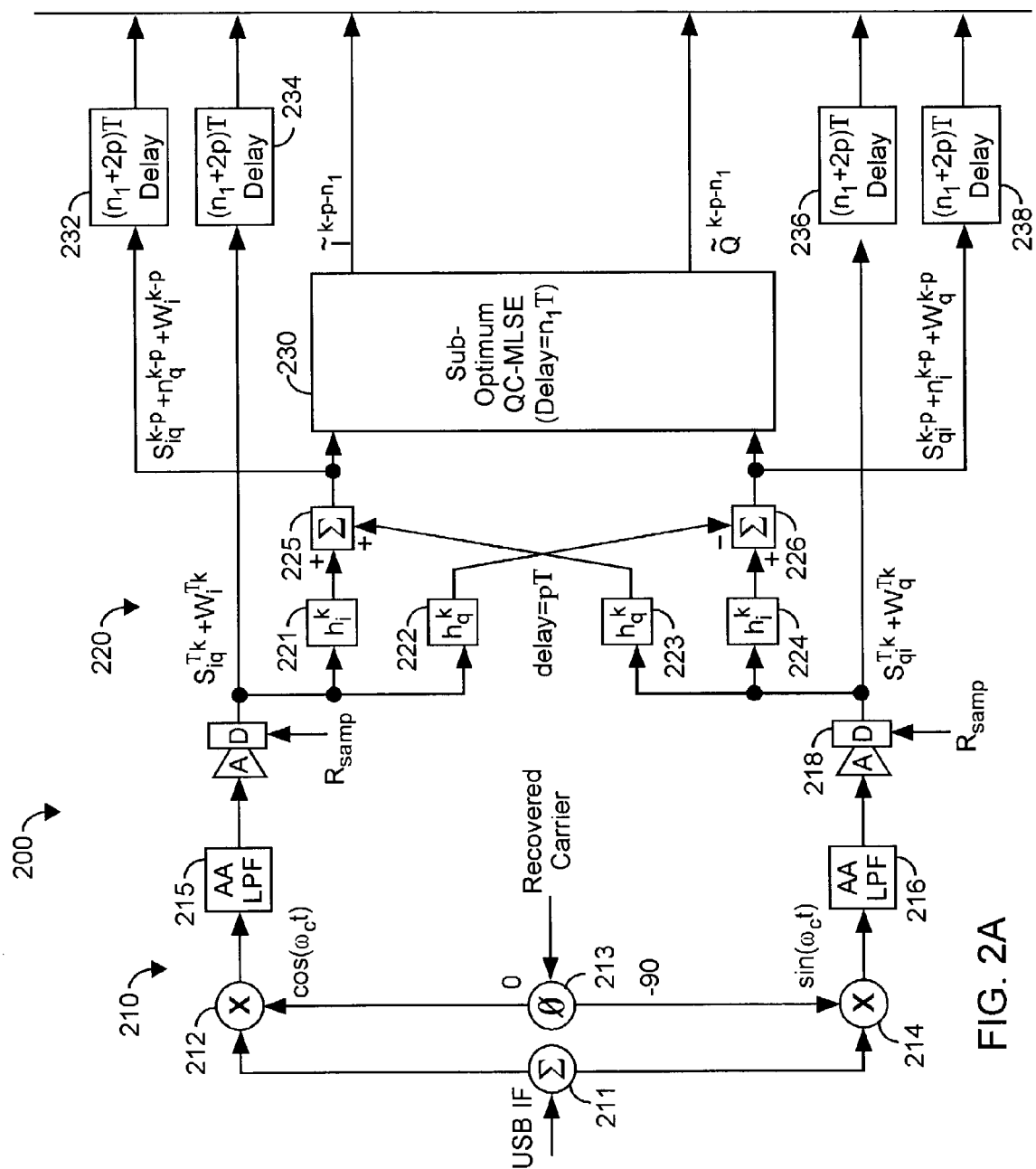
FIGS. 2A and 2B illustrate an exemplary filtered version of a QVSB correlated-noise estimator-subtractor receiver.
Figure 2B:
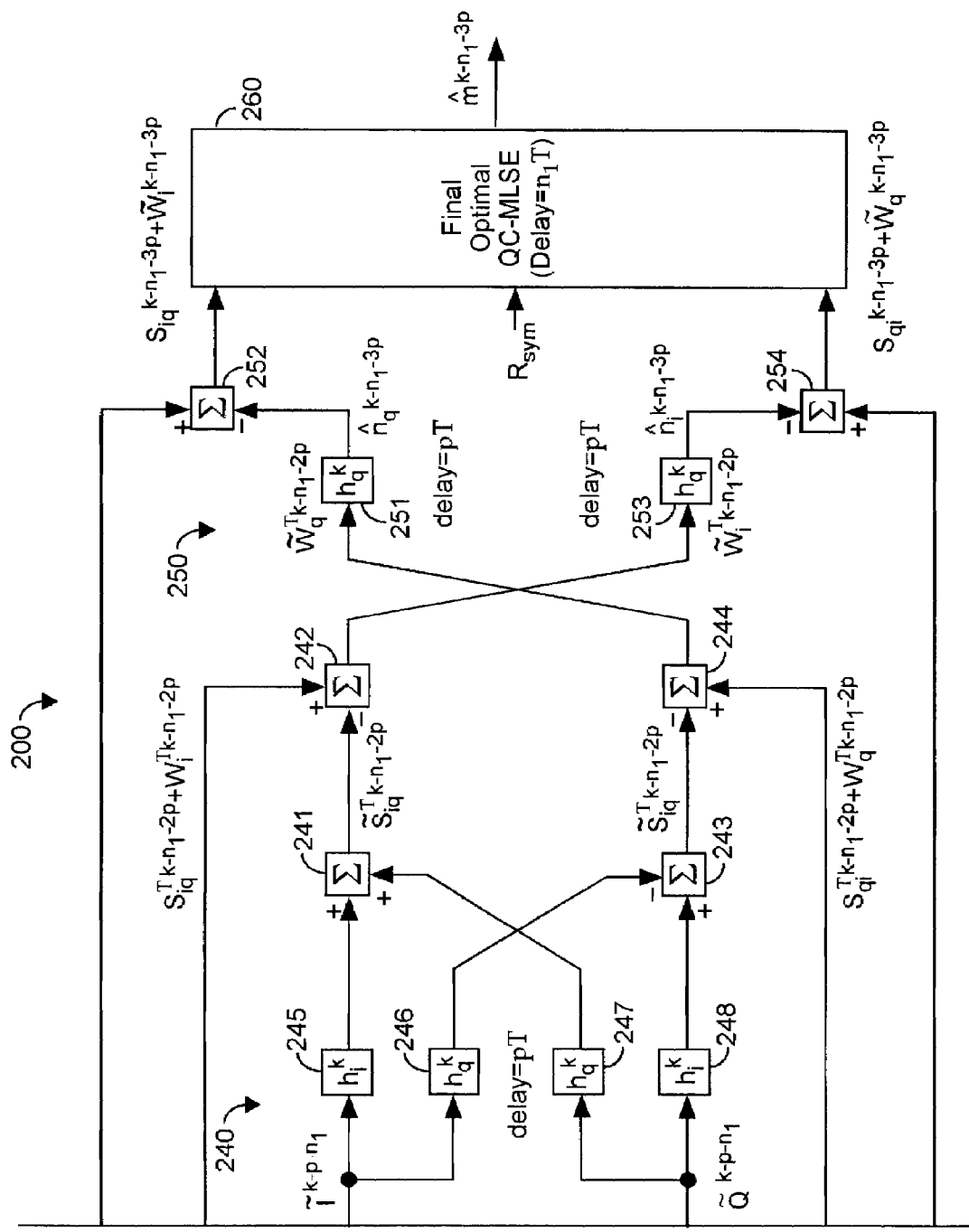

Referring to FIGS. 2A and 2B, an exemplary QVSB correlated-noise estimator-subtractor receiver 200 (with filtered reconstruction of the transmitted signal estimate) includes a demodulator front end 210, cross-coupled data filtering 220, a sub-optimum QC-MLSE 230, delays 232, 234, 236 and 238, a transmit waveform reconstructor 240, a correlated noise estimator 250, summers 242, 244, 252 and 254, and a final QC-MLSE 260 configured as shown. The transmitted signal 211 is translated to baseband by a demodulator I channel mixer 212 and a demodulator Q channel mixer 214 using a demodulator cosine carrier signal $\cos(\omega_C t)$ and a demodulator sine carrier signal $\sin(\omega_C t)$, respectively. A phase synchronized demodulation carrier signal $\omega_C$ is provided by a carrier synchronizer. The demodulation carrier signal $\omega_C$ is phase shifted by a $\phi$ demodulator ninety degree phase shifter 213 generating the demodulator cosine and sine carrier signals respectively communicated to demodulator I&Q channel mixers 212 and 214. It is well-known by those skilled-in-the-art that most data transmission receivers can be realized with analog or digital signal-processing techniques, and the analog/digital boundary can be moved forward or back in the processing chain for expediency purposes. A digitally-filtered embodiment is shown in FIGS. 2A and 2B. In the illustrated exemplary embodiment, the demodulator front-end 210 is analog, and the analog/digital boundary (A/D converters 217 and 218) has been placed at the demodulator front-end outputs after the anti-aliasing (AA) filters 215 and 216. The remainder of the signal processing is all-digital, which enables the cross-coupled data filtering to be more precise than with an analog implementation. The precision is necessary to achieve minimal intersymbol-interference (ISI) at the detection sampling instants such that bit-error-ratio (BER) performance is minimally impacted.

The cross-coupled data filtering 220 in the illustrated exemplary embodiment comprises filters 221, 222, 223 and 224 and summers 225 and 226 configured as shown. The data filters are, for example, finite impulse-response (FIR) realizations whose common delay, pT, is half the impulse-response aperture lengths. The transmit waveform reconstructor 240 in the illustrated exemplary embodiment comprises filters 245, 246, 247 and 248 and summers 241 and 243 configured as shown.

The signal processing of the sub-optimum and final optimal QC-MLSEs 230 and 260 is the same as in U.S. patent application Ser. No. 10/060,728 with the second QC-MLSE 260 in this disclosure having the advantage of operating in a whitened noise environment. The first QC-MLSE 230 provides sub-optimum I/Q representations of the data symbol estimates, which are shaped with the same cross-coupled filtering structure as in the modulator. The delays of these two modules are designated as $n_1 T$ and pT, respectively. The resultant I/Q transmitted waveshape estimates are subtracted by the summers 242 and 244 from the received signals to yield estimates of the I/Q channel white noise processes, $w^T_i$ and $w^T_q$. These white noises are then filtered by filters 251 and 253 to obtain the I/Q channel correlated-noise estimates, $\hat{n}_i$ and $\hat{n}_q$, with delay pT; which in turn are subtracted by the summers 252 and 254 from the receive-filtered I/Q signals to whiten the noises entering the final QC-MLSE 260. The second sequence estimator 260 then provides optimal estimates of the transmitted data, $\hat{m}$, with additional processing delay $n_2 T$.

QC-MLSE Description

Figure 3:
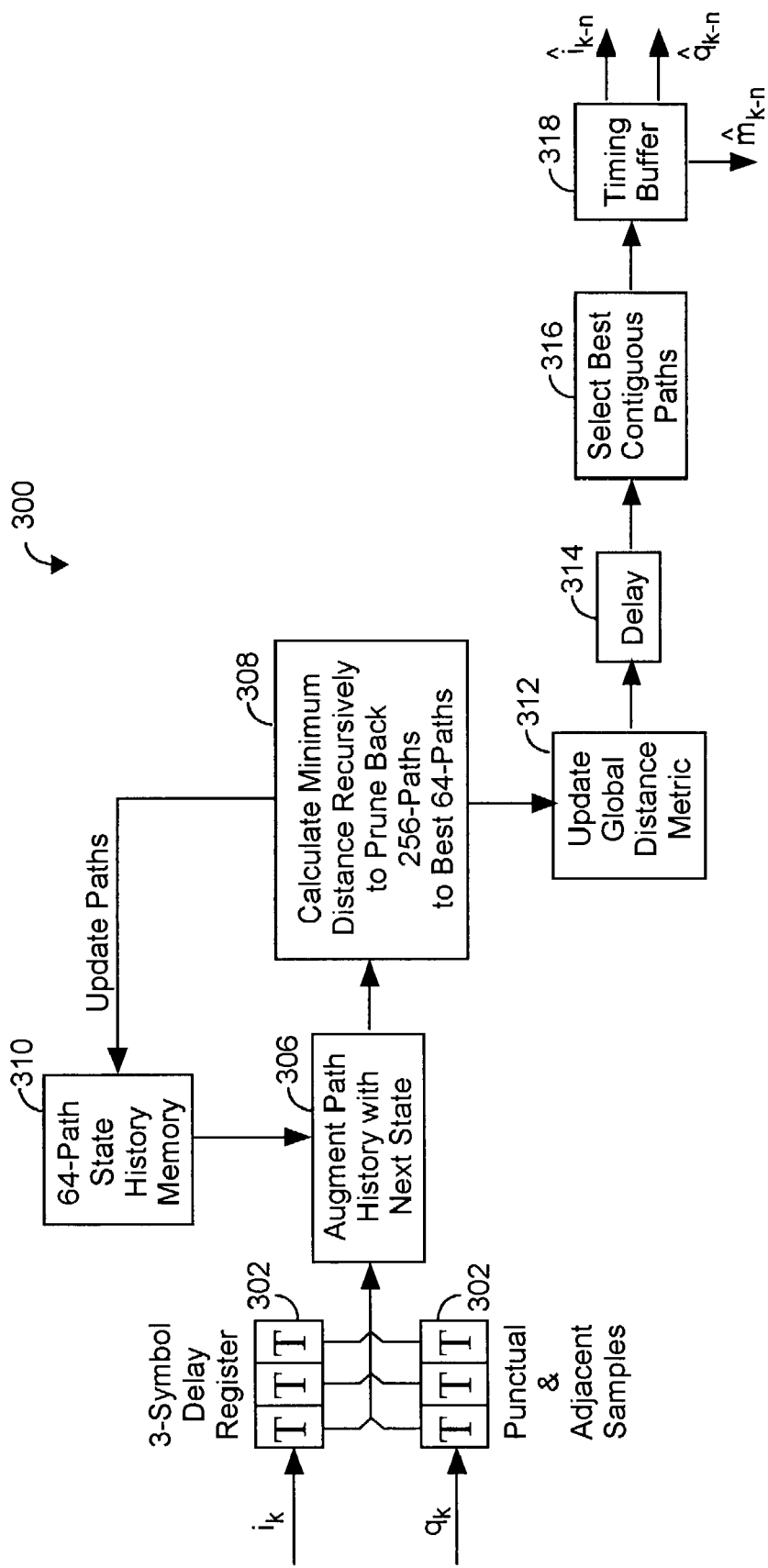
FIG. 3 is a functional block diagram of exemplary QC-MLSE processing.

The function of the QC-MLSE 300 is to reduce the total number of possible transmitted sequences down to the most likely sequences by using maximum likelihood techniques to reduce the number of paths through the trellis to the most likely paths. Referring to FIG. 3, the QC-MLSE 300 provides a delayed estimate of the most likely transmitted symbol sequence from parallel sets of noisy I/Q sample values in the three symbol delay registers 302 and 304. The delayed estimates are denoted by $\hat{i}_{k-n}$ and $\hat{q}_{k-n}$. The QC-MLSE 300 differs from conventional MLSE implementations in that conventional realizations typically process the I/Q channel samples independently; whereas the QC-MLSE 300 operates on paired I/Q samples, where each contain crosstalk-ISI from the other channel. Thus, the processing is unavoidably coupled between the two channels.

The decoding trellis may be represented as in FIG. 3, by a 64-state machine, with each state defined by the elements in the delay registers 302 and 304. The QC-MLSE 300 includes a local loop for generating local metric distances. The local loop includes the input shift registers 302 and 304, the step 306 of augmenting the path history with the next state, the step 308 of calculating minimum distance recursively to prune back 256-paths to the best 64-paths, and a 64-path state history memory 310. Sixty-four path operation is shown in the figure for illustrative purposes. The 64 path combinations are established by the fact that the transmitted signal is 4-ary, and three delay elements are employed ($4^3$). However, only 16 states out of the 64 combinations are actually possible, due to dependencies in the data shift-registers. Just three delay elements are needed when specialized QVSB data filtering is employed to restrict the ISI only to adjacent symbols, as described in U.S. patent application Ser. No. 10/060,728. In principle, any number of states could be used as long as the computing capacity is available. However, the number of calculations grows geometrically with the number of delayed sample values. It should also be noted that every time a new symbol enters the delay registers, two of the previous symbols remain. Therefore, the 16 existing states grow to 64-permutations; and each of these 16-states maps to four distinct, non-ambiguous states in the field of 64. Moreover, only four distinct states can enter a given state; and a given state can only spawn four distinct future states. Simulations have verified the extension to 9-ary and 16-ary signaling, which have 729-states ($9^3$) and 4096-states ($16^3$), respectively.

In general, the sequence estimate selected by the QC-MLSE must be chosen from a pool of $A^{L-1}$ sequences where A is the sequence alphabet size and L is the sequence length. This estimation problem is made tractable (and therefore implementable) by use of the well-known Viterbi, dynamic-programming algorithm. For a description of the conventional use of the Viterbi algorithm, see G. D. Forney, "Viterbi Algorithm," Proceedings of the IEEE, Volume 61, Number 3, pp. 268–278, March 1973, which is incorporated herein. The algorithm is based on generating samples of the observed signal, which are quantized to a finite number of possible values (states) at each sample time. The Viterbi process essentially maps the observed data into a set of states, which are dependent only on the previous state. This is made possible by exploiting the fact that the estimation process probability function can be maximized and updated recursively, once per symbol-time, using the metric calculations from the previous symbol.

For the QVSB implementation, each local metric calculation is based on two consecutive I/Q samples (four altogether). This local metric is then added to a running global metric at step 312. A sub-decision is made at the local level, and survivor paths are pruned at step 308 from the total number of paths, and stored in a memory 310 for augmenting the path history at step 306. Furthermore, the sub-decision is assuaged by the constraint that only one-fourth of the total number of available states can transition to the current state, which states, in turn, can only transition to one-fourth of the available output states. The path with the smallest combined metric is then selected by following each path back a sufficient number of symbols through the trellis such that the BER is minimized. The best path selection process provides bursts of optimally detected symbol sequences $\hat{Q}_k$ and $\hat{I}_k$. The timing buffer 318 is necessary to regulate a feedback flow of uniform I&Q channel timing signals $\hat{Q}_k$ and $\hat{I}_k$ to the QVSB demodulator for synchronization of the coherent demodulation. Hence, the QC-MLSE 300 receives the I&Q channel samples and provides data estimate $\hat{D}_m$ that are synchronously generated along with the I&Q channel signals $\hat{Q}_k$ and $\hat{I}_k$ for coherent demodulation through close loop synchronization.

Additional Embodiments

Figure 4A:
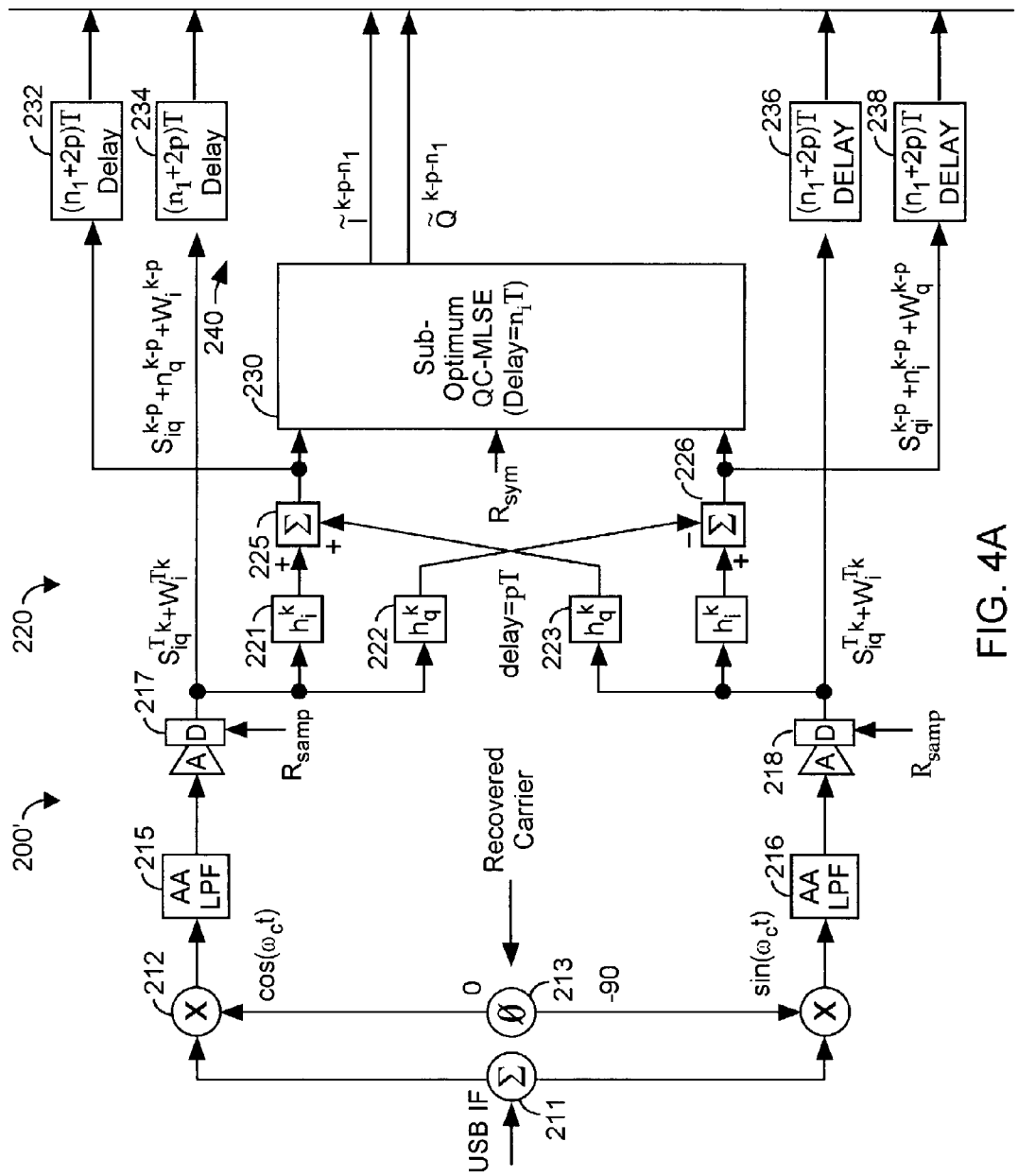
FIGS. 4A and 4B illustrate an exemplary table lookup version of a QVSB correlated-noise estimator-subtractor receiver.
Figure 4B:
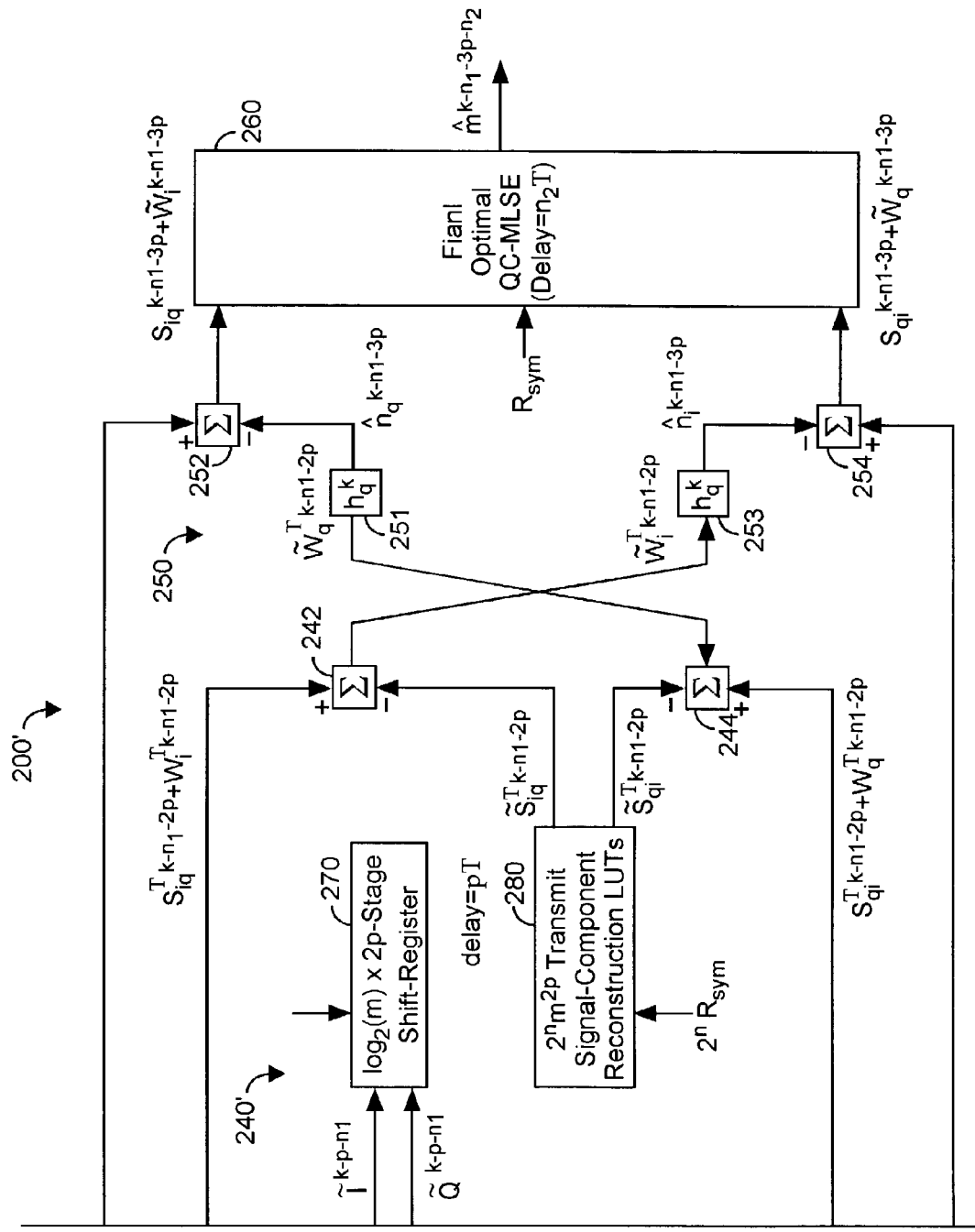

Referring to FIGS. 4A and 4B, an exemplary QVSB correlated-noise estimator-subtractor receiver 200' (with table lookup reconstruction of the transmitted signal estimate) includes a demodulator front end 210, cross-coupled data filtering 220, a sub-optimum QC-MLSE 230, delays 232, 234, 236 and 238, a transmit waveform reconstructor 240', a correlated noise estimator 250, summers 242, 244, 252 and 254, and a final QC-MLSE 260 configured as shown. The table lookup realization of the QVSB correlated-noise, estimator-subtractor receiver depicted in FIGS. 4A and 4B only differs from the digitally-filtered version (FIGS. 2A and 2B) in the reconstruction of the transmitted signals, $\tilde{s}^T_{iq}$ and $\tilde{s}^T_{qi}$. Since these I/Q signals are obtained from a deterministic mapping of the recovered transmitted message, $\hat{m}$, it is often less complex to implement the FIR filtering operation as a table lookup. In this manner, sub-optimum, digitally-quantized, recovered data estimates, $\hat{I}$ and $\hat{Q}$, are serially clocked into a shift-register 270 whose aperture length in symbols is the same as that of the FIR reconstruction filter of FIGS. 2A and 2B. The parallel outputs of the shift-register 270 make up the most-significant-bits (MSBs) of a set of memory addresses for a lookup table 280, and integer related sample clocks, $2^n R_{sym}$ to $2 R_{sym}$, comprise the remaining least-significant-bits (LSBs) of the memory address. The output samples are pre-calculated and stored in the memory. Moreover, $2^n$ samples per symbol are clocked out of memory for the particular sequence in the shift-register; and a new symbol enters the register every symbol time, right-shifting the previous sequence, thereby dropping off the rightmost symbol.

It has been observed that implementing the whitening approach of the present invention to correct a noise correlation that existed in the original demodulated signal results in a performance improvement of about 1.5 dB BER (i.e., about 1.5 dB closer to the Shannon Bound). Moreover, a high-rate turbo-product-code (TPC) can be used in conjunction with the QVSB structures of the present invention.

The principles of the present invention are applicable to a wide variety of applications, particularly those that require bandwidth-efficient digital data transmission. Exemplary satellite and terrestrial applications include: military, government and intelligence community communications, the Internet, digital cable-TV, high-definition television (HDTV), cellular telephones, personal communications services (PCS), digital audio radio services (DARS), low-earth-orbiting (LEO), medium-earth-orbiting (MEO), little LEO satellite systems, terrestrial microwave, etc.

Although the present invention has been described in terms of the embodiment(s) above, numerous modifications and/or additions to the above-described embodiment(s) would be readily apparent to one skilled in the art. It is intended that the scope of the present invention extends to all such modifications and/or additions.

We claim:

1. A communications method with correlated noise removal in a demodulator system, the method comprising the steps of:
    translating a quadrature vestigial-sideband (QVSB) signal to inphase and quadrature (I/Q) baseband components, $r^T_{iq}$ and $r^T_{qi}$;
    filtering the baseband components to generate I and Q channel cross-coupled filtering outputs;
    estimating transmitted data content of the I and Q channel cross-coupled filtering outputs;
    employing the estimated data content to reconstruct originally transmitted I/Q signals, $\tilde{s}^T_{iq}$ and $\tilde{s}^T_{qi}$;
    processing the reconstructed signal components and the inphase and quadrature (I/Q) baseband components to generate correlated-noise estimates, $\hat{n}_i$ and $\hat{n}_q$;
    subtracting the correlated-noise estimates, $\hat{n}_i$ and $\hat{n}_q$, from the cross-coupled filtering outputs to yield receive-filtered I/Q signals in white noise, $r_{iq}$ and $r_{qi}$; and
    procesing the receive-filtered I/Q signals in white noise to provide optimal data estimates, $\hat{m}$.

2. The communications method with correlated noise removal of claim 1, wherein the step of filtering the baseband components comprises:
    employing a set of cross-coupled, matched data filters to filter the baseband components.

3. The communications method with correlated noise removal of claim 1, wherein the step of estimating transmitted data content of the I and Q channel cross-coupled filtering outputs comprises:
    employing a quadrature-crosstalk, maximum-likelihood-sequence-estimator (QC-MLSE) adapted from a Viterbi algorithm.

4. The communications method with correlated noise removal of claim 1, wherein the step of employing the estimated data content to reconstruct originally transmitted I/Q signals comprises:
    waveshaping the estimated data content with filters.

5. The communications method with correlated noise removal of claim 1, wherein the step of employing the estimated data content to reconstruct originally transmitted I/Q signals comprises:
    waveshaping the estimated data content with a lookup table.

6. The communications method with correlated noise removal of claim 1, wherein the step of processing the reconstructed signal components and the inphase and quadrature (I/Q) baseband components to generate correlated-noise estimates comprises:

subtracting the reconstructed signal components from the inphase and quadrature (I/Q) baseband components to generate uncorrelated white noise processes; and cross-couple filtering the uncorrelated white noise processes.

7. The communications method with correlated noise removal of claim 1, wherein the step of processing the receive-filtered I/Q signals in white noise to provide optimal data estimates comprises:

employing a quadrature-crosstalk, maximum-likelihood-sequence-estimator (QC-MLSE) to create preliminary, hypothetical data estimates.

8. A quadrature vestigial-sideband (QVSB) demodulator system with correlated noise removal, comprising:

a demodulator front-end for translating an incoming signal to inphase and quadrature (I/Q) baseband components, $r^T_{iq}$ and $r^T_{qi}$;

a set of cross-coupled, matched data filters for filtering the baseband components to generate I and Q channel cross-coupled filtering outputs;

an initial quadrature-crosstalk,maximum-likelihood-sequence-estimator (QC-MLSE) for estimating transmitted data content of the I and Q channel cross-coupled filtering outputs;

a transmit waveform reconstructor for employing the estimated data content to reconstruct originally transmitted I/Q signals, $\hat{s}^T_{iq}$ and $\hat{s}^T_{qi}$;

a correlated-noise estimator-subtractor for processing the reconstructed signal components and the inphase and quadrature (I/Q) baseband components to generate correlated-noise estimates, $\hat{n}_i$ and $\hat{n}_q$, and for subtracting the correlated-noise estimates, $\hat{n}_i$ and $\hat{n}_q$, from the cross-coupled filtering outputs to yield receive-filtered I/Q signals in white noise, $r_{iq}$ and $r_{qi}$; and a final QC-MLSE for processing the whitened I/Q inputs to provide optimal data estimates, $\hat{m}$.

9. The quadrature vestigial-sideband (QVSB) demodulator system with correlated noise removal of claim 8, wherein:

the transmit waveform reconstructor comprises data filters.

10. The quadrature vestigial-sideband (QVSB) demodulator system with correlated noise removal of claim 8, wherein:

the transmit waveform reconstructor comprises cross-coupled data filtering.

11. The quadrature vestigial-sideband (QVSB) demodulator system with correlated noise removal of claim 8, wherein:

the transmit waveform reconstructor comprises data filters with finite impulse-response (FIR) realizations.

12. The quadrature vestigial-sideband (QVSB) demodulator system with correlated noise removal of claim 8, wherein:

the transmit waveform reconstructor comprises a lookup table.

13. The quadrature vestigial-sideband (QVSB) demodulator system with correlated noise removal of claim 8, wherein:

the correlated-noise estimator-subtractor includes filters that are the same as filters in the set of cross-coupled, matched data filters.

* * * * *